United States Patent [19]
Thomas et al.

[11] Patent Number: 5,255,632
[45] Date of Patent: Oct. 26, 1993

[54] ANIMAL FEEDER HAVING LIQUID SENSOR CONTROLLING DRINKING WATER VALVE

[75] Inventors: Richard J. Thomas, Eddyville; Larry L. Coleman, Broken Bow, both of Nebr.

[73] Assignee: Gro Master, Inc., Omaha, Nebr.

[21] Appl. No.: 869,226

[22] Filed: Apr. 14, 1992

[51] Int. Cl.⁵ .......................... A01K 5/00; A01K 7/06
[52] U.S. Cl. .................. 119/51.5; 119/53.5; 119/54; 119/72
[58] Field of Search ............... 119/51.5, 72, 74, 53, 119/53.5, 54; 137/392, 386, 2; 251/129.15, 129.02, 129.22

[56] References Cited

U.S. PATENT DOCUMENTS

| | | | |
|---|---|---|---|
| 3,023,770 | 3/1962 | Godshalk | 119/72 |
| 3,233,590 | 2/1966 | Venca | 119/51.5 |
| 3,441,004 | 4/1969 | Henke et al. | 119/72 |
| 3,765,644 | 10/1973 | Zeuner | 251/129.02 |
| 3,798,401 | 3/1974 | Kochanski et al. | |
| 3,829,060 | 8/1974 | von Lewis | 251/129.02 |
| 4,051,812 | 10/1977 | DeLoach et al. | 119/51.5 |
| 4,182,273 | 1/1980 | Peterson | 119/51.5 |
| 4,252,083 | 2/1981 | Gilst et al. | 119/51.5 |
| 4,491,146 | 1/1985 | Sveds | 137/392 |
| 4,612,949 | 9/1986 | Henson | 137/392 |
| 4,660,508 | 4/1987 | Kleinsasser et al. | |
| 4,743,717 | 5/1988 | Peterson | |
| 4,744,808 | 5/1988 | Treu | |
| 5,026,954 | 6/1991 | Cebulski | |

Primary Examiner—Gene Mancene
Assistant Examiner—Todd E. Manahan
Attorney, Agent, or Firm—Zarley, McKee, Thomte, Voorhees & Sease

[57] ABSTRACT

A hog feeder having dry feed fed by gravity to a trough includes a supply of water thereto. A liquid sensor, relay and solenoid valve are used to maintain the water in the trough at a predetermined level. The liquid sensor used to maintain the liquid level at a predetermined level includes an electrically operated sensor that does not malfunction due to abuse by hogs or due to becoming caked with dirt or feed.

1 Claim, 2 Drawing Sheets

ANIMAL FEEDER HAVING LIQUID SENSOR CONTROLLING DRINKING WATER VALVE

BACKGROUND AND SUMMARY OF THE INVENTION

Small animal feeders and waterers exist on the present market based on the use of a feed hopper which feeds dry feed by gravity to a ledge below the hopper, from which ledge the animals scrape feed off into a trough for mixing with water supplied by a water line running lengthwise below the ledge. Some feeders operate without the aforementioned ledge. The water line has an inlet connected to a source of water supply. A plurality of animal-activated nipples are located in the water line for activation by the animals. The problem is that the animals "play with" the nipples and tend to flood the trough with excess water.

Accordingly, a main object of the invention is to provide an automatic shut-off valve at the inlet end of the water line, which shuts off the water when it attains a predetermined level in the trough. A further object of the invention is to make the control of an electrical type, utilizing low-amperage current for operation, thus eliminating damage to the animals. A further feature is to utilize an electrical conductor extending into the trough as a water sensor and to insulate this conductor as well as to shield it from possible damage by the animals' snouts. Further advantages reside in a simple, low-cost arrangement comprising relatively few parts that are easily installed and maintained.

It is also possible to use the water level control in other environments where the level of an electrically conductive liquid needs to be regulated.

Further features and objects will appear as the description of a preferred form of the invention proceeds.

DETAILED DESCRIPTION OF A PREFERRED EMBODIMENT OF THE INVENTION

Figure 1:
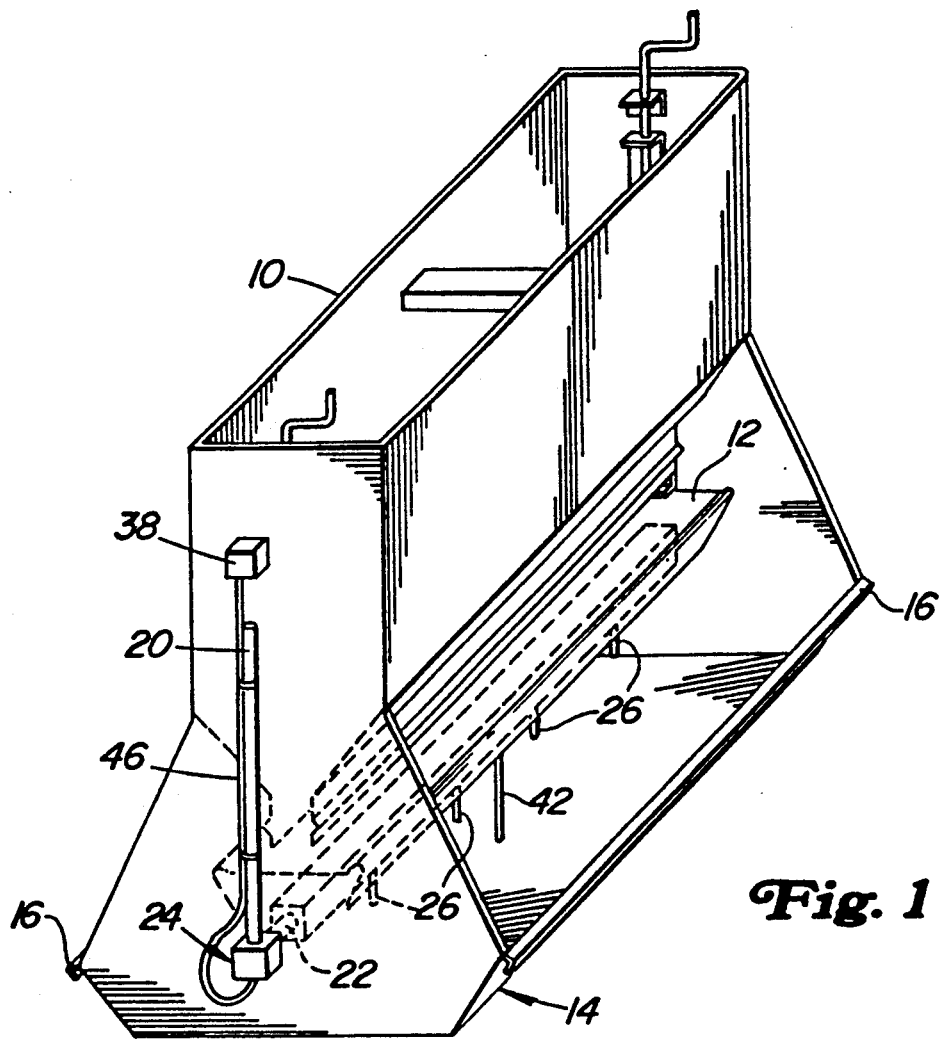
FIG. 1 is a simplified perspective of a typical animal feeder to which the invention may be adapted.
Figure 2:
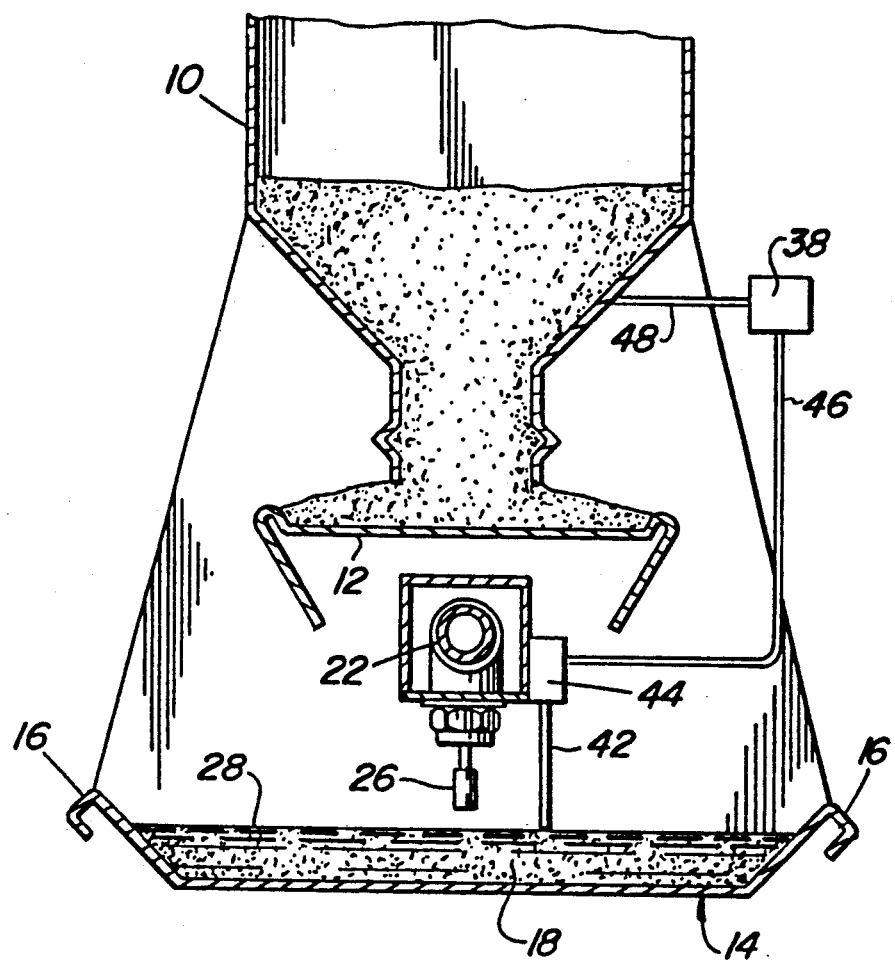
FIG. 2 is an enlarged section showing the relationship of the parts, including schematic illustration of the electrical circuit involved.

The feeder unit shown in FIGS. 1 and 2 is typical of those available in the prior art; e.g., in the Kleinsasser U.S. Pat. No. 4,660,508, which is incorporated herein by reference. In such feeder, a hopper (10) of sheet metal, or the like, receives dry feed via its open top, as by means of conveyors)or the like, not shown. The hopper is open at its bottom for the gravity feed of dry feed to an elongated horizontal ledge (12) which intervenes between the bottom of the hopper and a like elongated trough (14) disposed lengthwise of and beneath the ledge. The trough has opposite longitudinal edges (16) spaced outwardly and below the level of the ledge so that feeding animals such as pigs can scrape dry food off the ledge for gravity flow to the trough. The size of the unit is such that several pigs can feed from both sides of the trough at once. A representative amount of dry feed shows in the trough at (18).

It is also typical in feeders of the type disclosed to provide drinking water for the animals and it has been found expedient to enable the animals, to some extent, to control the amount of water for drinking directly or for mixing with the dry feed, at least to the extent that considerable spillage of water results. For this purpose, a main water supply line (20) is connectible to any source of supply and extends as an elongated extension (22) lengthwise of and directly beneath the ledge (16). In this preferred embodiment (10), the nipple valves have been eliminated, but they could still be used, if desired, with the relay (38) and cut off valve (24) of the present invention.

A main cut-off or water supply valve (24) is disposed externally of the trough at one end thereof, the details and function of which will appear subsequently. Downstream of the valve (24), the line (22) is provided with a plurality of conventional water outlets (26). From the description thus far, it will be seen that, so long as the valve (24) is open, water is free to flow via the outlets (26) to the trough to mix with the dry feed therein, as at a predetermined level (28). It has been determined that water in excess of this level results in waste of both water and feed and, accordingly, the valve (24) is made responsive to attainment of the level (28) to cut off the water.

Figure 3:
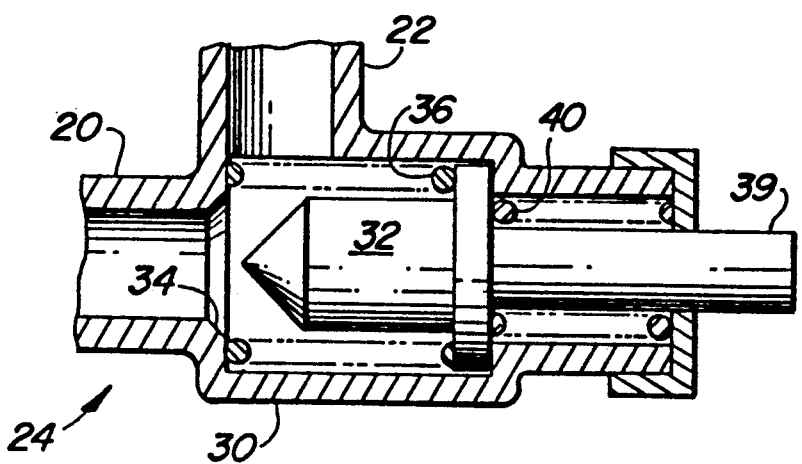
FIG. 3 is an enlarged section of a combined valve and relay for operating the valve.

A representative valve (24) is shown in FIG. 3 as comprising a casing or housing (30) having a plunger (32) for controlling a water inlet seat (34) between the inlet (20) and extension or outlet (22). A coil spring (36) biases the plunger to an open position in the direction of incoming water pressure and thus establishes flow from the inlet (22) to the outlet (22). The plunger may have a coaxial extension (39) acted on by an electrical coil (40) to provide a relay which, when activated, closes the plunger (32) against the seat, thus cutting off water to the line (22). In the diagrammatic illustration in FIGS. 1 and 2, the relay is shown separately at (38) and the cut-off valve at (24) (FIG. 1). The electric circuitry includes a conductor or feeler (42) suitably attached, for example, to the water line extension (22), and projecting downwardly from an insulated protective support (44) to approximately the water level (28) and continues upwardly as a lead (46) to the relay. A conductor (48) connects the other side of the relay to the feeder, which is grounded.

As long as the mixture of water and feed is below the bottom of conductor (42), there is no flow of electricity through the relay (38). However, once the level (28) of water and feed rises to touch conductor (42), this causes a very low current in milliamps to flow through the feed and water (18), into the metal feeder (14) and complete the circuit with line (48) which is also part of the metal feeder where the line (48) is grounded to the metal feeder (14). This completed circuit triggers the relay (38) and supplies 110-volt power to the solenoid valve (24) to close the solenoid valve (24) as described above. If desired, the conductor (42) can be encompassed within a plastic housing (44) which extends all the way down to the upper level of the water and feed (28), shown in FIG. 2, to protect it from abuse by hogs using the feeder.

The water level control apparatus is also applicable to other environments which require regulation of a liquid level and where conventional types of control mechanisms, such as float operated valves, may fail. This liquid control apparatus, anywhere that the sensor might malfunction, due to a buildup of sludge (e.g. sewage disposal plants) or be subject to abuse, such as in the above example where hogs might damage a float mechanism (sewage/sludge might also clog it up to the point that it would not work).

It will be seen from the foregoing that a simple, low-cost and effective system has been provided for solving the problem of food and water wastage in feeders of the type disclosed. It is seen also that the system can be readily adapted to existing feeders with material alterations and expense. Further features will occur to those versed in the art, all without departure from the spirit and scope of the invention.

We claim:
1. In combination,
a source of water,
a feeder unit for animals comprising an elongate trough having a base and a side wall for receiving and containing feed and water and arranged such that the head of the animal can reach over an upper front edge of the side wall to the base for eating the feed and water, an elongate shelf extending substantially along a full length of the trough and providing a substantially horizontal surface for receiving feed, said horizontal surface of said shelf being arranged at a height above and rearwardly of said front edge so as to allow access by the head of the animal to said shelf for direct feeding therefrom, and between said shelf and said front edge to said base, hopper means for directly and continuously depositing feed onto said shelf, said shelf being arranged such that the deposited feed thereon remains on said shelf but can be removed to the trough by the animal, nozzle means for dispensing water into the trough arranged such that it avoids dispensing water onto the shelf and including means actuable by the animal for controlling the dispensing, said nozzle means being operatively connected to said source of water, an inlet valve positioned between said nozzle means and said source of water for controlling the flow of water to said nozzle means, liquid sensor means positioned below said shelf and above said base of said trough so that said liquid sensor means is disposed above the water and feed in said trough, electrical circuit means operatively connected to said liquid sensor means and said inlet valve means for shutting said inlet valve means when said liquid sensor means senses the presence of liquid in contact therewith to control the level of water in said trough.

* * * * *